(12) United States Patent
Yaakov et al.

(10) Patent No.: US 6,307,361 B1
(45) Date of Patent: Oct. 23, 2001

(54) METHOD AND APPARATUS FOR REGULATING THE INPUT IMPEDANCE OF PWM CONVERTERS

(75) Inventors: Shmuel Ben Yaakov, Beer Sheva; Menachem Hadar, Yavne, both of (IL)

(73) Assignee: Green Power Technologies Ltd., Rehovot (IL)

( * ) Notice: Subject to any disclaimer, the term of this patent is extended or adjusted under 35 U.S.C. 154(b) by 0 days.

(21) Appl. No.: 09/840,889

(22) Filed: Apr. 25, 2001

(51) Int. Cl.[7] ............................. G05F 1/46; G05F 1/614
(52) U.S. Cl. ........................................ 323/288; 323/284
(58) Field of Search ............................. 323/222, 282, 323/284, 285, 288, 290, 351

(56) References Cited

U.S. PATENT DOCUMENTS 5,111,133 * 5/1992 Poulo ..................................... 323/286
5,479,090 * 12/1995 Schultz .............................. 323/288 X
6,034,513 * 3/2000 Farrington ........................ 323/288 X

* cited by examiner

*Primary Examiner*—Jessica Han
(74) *Attorney, Agent, or Firm*—Mark M. Friedman

(57) ABSTRACT

A controller for a PWM converter. The low frequency input impedance is an important parameter of PWM converters. In active power factor correction schemes, this impedance needs to resistive in order to keep the power factor near unity. The controller of the present invention will force the input terminals of a PWM converter, and in particular that of a Boost converter, to look resistive, or with a reactive component as desired. The advantages of the controller according to the present invention are simplicity, low cost, robustness and the fact that it does not require an analog multiplier and does not require sensing the input voltage.

10 Claims, 3 Drawing Sheets

METHOD AND APPARATUS FOR REGULATING THE INPUT IMPEDANCE OF PWM CONVERTERS

FIELD AND BACKGROUND OF THE INVENTION

The present invention relates to a controller for regulating the input impedance of pulse width modulation converters (PWM converters), and) more particularly, to a controller for regulating the input impedance of pulse width modulation converters for active power factor correction.

PWM converters are widely used for DC-DC, DC-AC, AC-DC and AC-AC conversion. In some cases the purpose of the PWM converter is to shape the input current waveform as seen at the input of the converter. For example, in active power factor correction (APFC), the function of the converter is to ensure that the AC current seen by the source is in phase with the source voltage and has minimum higher-order harmonics. The present application uses the term "pulse width modulation converter" and the equivalent term "PWM converter" to denote any circuit which actively switches reactive components in a network in such a way as to control the impedance of the network by varying the timing of the active switching. An important class of PWM converters is based on what is referred to as the "boost topology." A typical well-known embodiment of a PWM converter in the boost topology is used as an APFC circuit and is shown in FIG. 1. In this "boost converter", the input voltage is rectified by a full-wave rectifier $D_1$ and fed to a boost stage with an input inductor $L_{in}$, a duty switch $S_1$, a high frequency rectifier $D_2$ an output filter capacitor $C_o$ and a load $R_L$. Duty switch $S_1$ is opened and closed by a high frequency control signal in such a way as to force the input current ($i_{in}$) to follow the shape of the rectified input voltage ($v_{inR}$). Because of this, the input terminal will look resistive rather than reactive. That is, the power factor (PF) will be equal to unity. By varying the timing of the active switching in other ways, the input impedance of the boost converter can also be made to look reactive, either capacitive or inductive, or as a combination of reactive and resistive loads. In all such applications, the controlling of the timing of the active switching (duty switch $S_1$ in FIG. 1) is crucial to attaining the desired results.

A control circuit is required for a PWM converter, in order to operate duty switch $S_1$ properly to achieve the desired shaping of the input current waveform, and the present application uses the term "control circuit" to denote any mechanism which performs or governs the switching for a PWM converter. The present application uses the term "duty cycle" to denote any repetitive sequence of switching characterized by a first time period for a given state followed by a second time period of the opposite state, the sequence taking place over a given time interval. The present application uses the term "duty cycle period" to denote the given time interval of the duty cycle. The present application uses the term "duty switch" to denote any device which controls electricity and which may be characterized by two opposite states. Examples of duty switches include, but are not limited to, transistors, relays, and the like, and is illustrated in a circuit as duty switch $S_1$ in FIG. 1. A duty cycle is illustrated in FIG. 2. For convenience in reference, the present application uses the terms "opened" and "closed" to denote the two opposite switching states, and also uses the equivalent designations "off" and "on" respectively. In FIG. 2 the total duty cycle period is a period $T_S$. During duty cycle period $T_{OFF}$ the duty switch is opened, and during duty cycle period $T_{ON}$ the duty switch is closed. The control circuit for a PWM converter generates a signal characterized by a duty cycle having a specified ratio of the closed switching time period to the total duty cycle time period ($T_{ON}/T_{OFF}$). The present application uses the term "regulating the duty cycle" to denote the adjustment of this ratio of the closed switching time period to the total duty cycle time period. It is also common in the art to refer to the varying of the duty cycle time periods as a "pulse width modulation," wherein the term "pulse width" refers to the closed or opened switching period, as illustrated in FIG. 2, and wherein the term "modulation" refers to the varying of these periods. In the art there are different regimes for performing pulse width modulation. It is possible to hold the total duty cycle period constant and vary the opened and closed time periods, such that as one increases the other decreases. It is also possible to hold either the opened or the closed time period constant and increase the other, so that the total duty cycle period increases.

Prior art control circuits are complicated, and in particular, they require an analog multiplier and sensing of the input voltage as a reference to the desired shape of input current. This adds to the cost and increases the sensitivity to noise and temperature changes. A multiplier is needed when a boost converter is operated in what is referred to as the "continuous current mode" (CCM). In the continuous current mode, the current through inductor $L_{in}$. (FIG. 1) does not drop to zero during a given duty cycle. Furthermore, existing control circuits need to sense the input voltage in order to regulate the current properly. It is well-known in the art that this may introduce further noise as well as to create distortion of the input current.

For what is referred to as the "discontinuous current mode" (DCM), the prior art control circuit is simpler and does not require an analog multiplier. However, as is known in the art, DCM control circuits are less efficient and are unsuitable for high power use.

There is thus a widely recognized need for, and it would be highly advantageous to have, a continuous current mode active power factor correction control circuit which does not require an analog multiplier and does not need to sense the input voltage. It would also be desirable to be able to construct such a control circuit using fewer components of lower cost. These goals are met by the present invention.

SUMMARY OF THE INVENTION

The present invention discloses an innovative method and control circuit for regulating the continuous current mode duty cycle of a boost converter for the purpose of shaping the waveform of the input current of the boost converter to conform to the shape of the waveform of the input voltage into the boost converter. Doing so makes the boost converter appear to be a resistive load rather than a reactive load, thereby increasing the power factor to unity and reducing the total harmonic distortion.

The innovative features of the method and the control circuit according to the present invention include the use of a ramp signal generator whose voltage slope varies according to the output voltage of the boost converter, coupled with a threshold determined by the boost converter current. These enable the continuous current mode duty cycle of the pulse width modulation to be accurately regulated during changing load conditions without the need for expensive analog multiplier circuitry, without the need to sense the input voltage, and without the introduction of additional noise and distortion resulting therefrom.

Therefore, according to the present invention there is provided a method for controlling the duty cycle of a duty switch within a boost converter in order to regulate the input impedance of the boost converter, the boost converter having an output voltage and an input current, the method including the steps of: (a) providing a ramp signal having a slope determined by the output voltage; (b) putting the duty switch into a first state when the ramp signal is reset; (c) providing a threshold determined by the input current; (d) comparing the ramp signal to the threshold; and (e) putting the duty switch into a second state when the ramp signal reaches the threshold.

According to the present invention there is also provided a control circuit for controlling the duty cycle of a duty switch within a boost converter in order to regulate the input impedance of the boost converter, the duty switch assuming one of a plurality of states, the boost converter having an output voltage and an input current, the control circuit including: (a) a dependent ramp signal generator for generating a ramp signal, wherein the slope of the ramp signal is controlled by the output voltage; (b) a mechanism for sensing the input current and outputting a threshold signal which is a function of the input current; (c) a threshold detector for comparing the ramp signal to the threshold signal; and (d) a mechanism for controlling the state of the duty switch according to the comparing.

The method and control circuit according to the present invention thereby overcome the shortcomings of existing control circuits, which require analog multipliers and input voltage sensing.

BRIEF DESCRIPTION OF THE DRAWINGS

The invention is herein described, by way of example only, with reference to accompanying drawings, wherein.

DESCRIPTION OF THE PREFERRED EMBODIMENTS

The present invention is of a control circuit for regulating a duty cycle. Specifically, the present invention can be used to achieve power factor correction in conjunction with a boost converter. The principles and operation of a control circuit according to the present invention may be better understood with reference to the drawings and the accompanying description.

Figure 1:
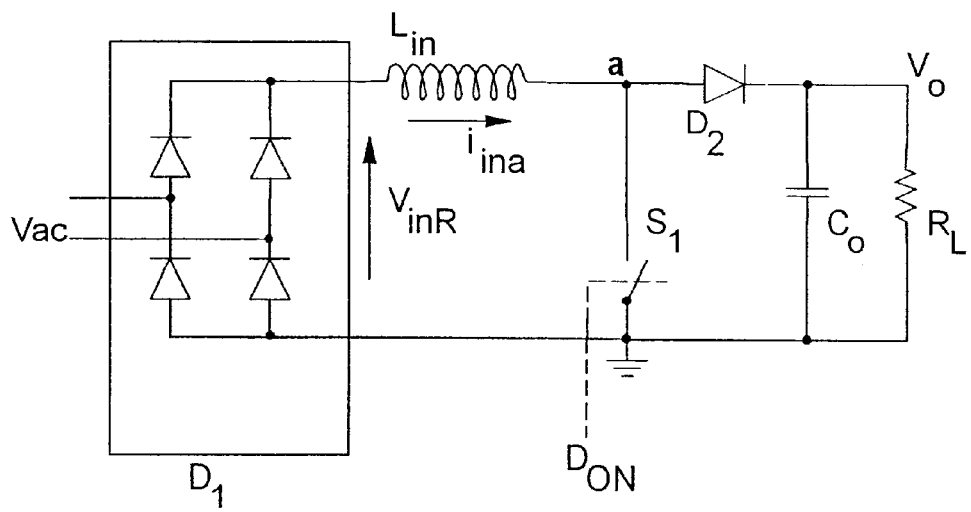
FIG. 1 illustrates the prior art boost topology.
Figure 2:
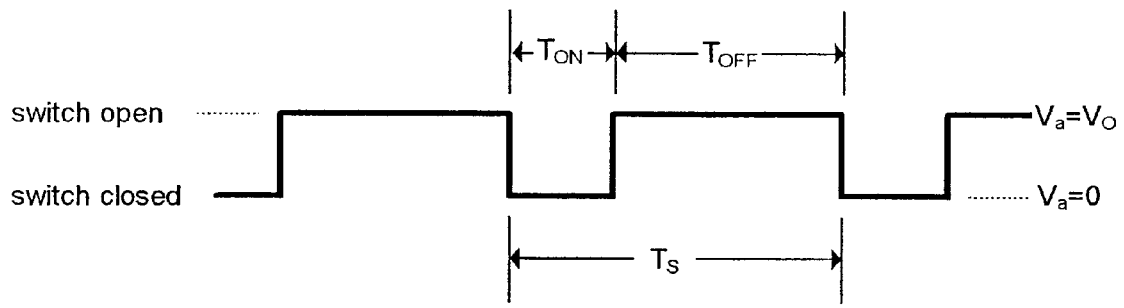
FIG. 2 illustrates the duty cycle for a boost converter.

Referring again to FIG. 1, the voltage seen at point a ($V_a$) is a pulsating voltage of maximum amplitude $V_o$ and a duration of time denoted as $T_{OFF}$ (when duty switch $S_1$ is opened). When duty switch $S_1$ is closed, $V_a$ is zero. The duty cycle is illustrated in FIG. 2. A duty cycle portion of duration $T_{OFF}$ corresponds to a "duty switch opened" condition, where the voltage $V_a$ at point a is $V_o$. A duty cycle portion of duration $T_{ON}$ corresponds to a "duty switch closed" condition, where the voltage $V_a$ at point a is zero. The total duty cycle has a period $T_S$. Consequently, the average voltage at point a ($v_{av}$) will be:

$$v_{av} = \frac{V_o T_{OFF}}{T_S} \tag{1}$$

where $T_S$ is the total duty cycle period, also known as the "PWM switching period." This is the same as:

$$v_{av} = V_o D_{OFF} \tag{2}$$

where $$D_{OFF} = \frac{T_{OFF}}{T_S} \tag{3}$$

The closed duty cycle time period $D_{ON}$, when. duty switch $S_1$ is conducting (during $T_{ON}$) is similarly defined as:

$$D_{ON} = \frac{T_{ON}}{T_S} \tag{4}$$

The input voltage ($v_{inR}$) fed to the boost converter is assumed to be of low frequency as compared to the switching frequency ($f_s = 1/T_s$) and hence can be considered constant over several switching periods ($T_s$). Assuming that the power stage is properly controlled, the average low frequency voltage across $L_{in}$, will be close to zero (otherwise the current will increase to very high values). This implies that $$v_{inR} = v_{av} \tag{5}$$

or, from Equation (1):

$$v_{inR} = V_o D_{OFF} \tag{6}$$

If $D_{OFF}$ is regulated according to the rule:

$$D_{OFF} = K i_{ina} \tag{7}$$

where K is a constant and $i_{ina}$ is the low frequency component of the input current ($i_{in}$) then $$v_{inR} = V_o K i_{ina} \tag{8}$$

or:

$$i_{ina} = \frac{v_{inR}}{V_o K} \tag{9}$$

Assuming now that output filter capacitor $C_o$ (FIG. 1) is sufficiently large so that the ripple of $V_o$ can be neglected, it is seen that, according to Equation (9), the input current will simply be proportional to the input voltage. That is, the boost converter will look resistive with an apparent input resistance $R_e$ given by:

$$R_e = K V_o \tag{10}$$

The value of the input resistance and hence the input current can thus be controlled by varying K. In practical applications, $V_O$ must be kept constant even if load $R_L$ (FIG. 1) varies. In this prior art control scheme, the output voltage can be kept constant by closing a feedback loop on K. This prior art is shown conceptually in FIG. 3. To control the boost converter, a current sensor 28 outputs a voltage $v_{iin}$ which is proportional to the input current $i_{ina}$. This voltage $V_{iin}$ is input into an analog multiplier 26. The output voltage $V_o$ is input into an error amplifier 24 whose reference input is $V_{ref}$, and the output of error amplifier 24 is also input into analog multiplier 26. The output of analog multiplier 26 is a product which is proportional to $i_{ina}$ by a given factor K. This output is input into a pulse width modulator 22 to generate $D_{OFF}$ according to Equation (7).

Figure 3:
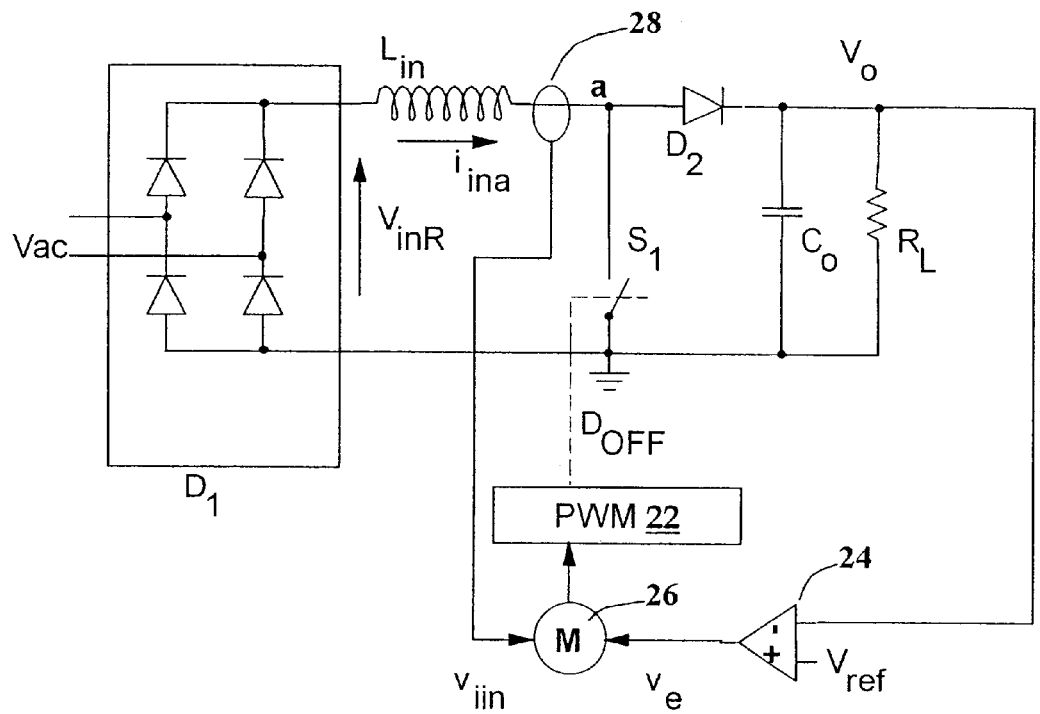
FIG. 3 illustrates conceptually the prior art principle using an analog multiplier to control a boost converter.

The shortcoming of the conceptual implementation as shown in FIG. 3 is the need for analog multiplier 26. This shortcoming is overcome by the present invention.

Figure 4:
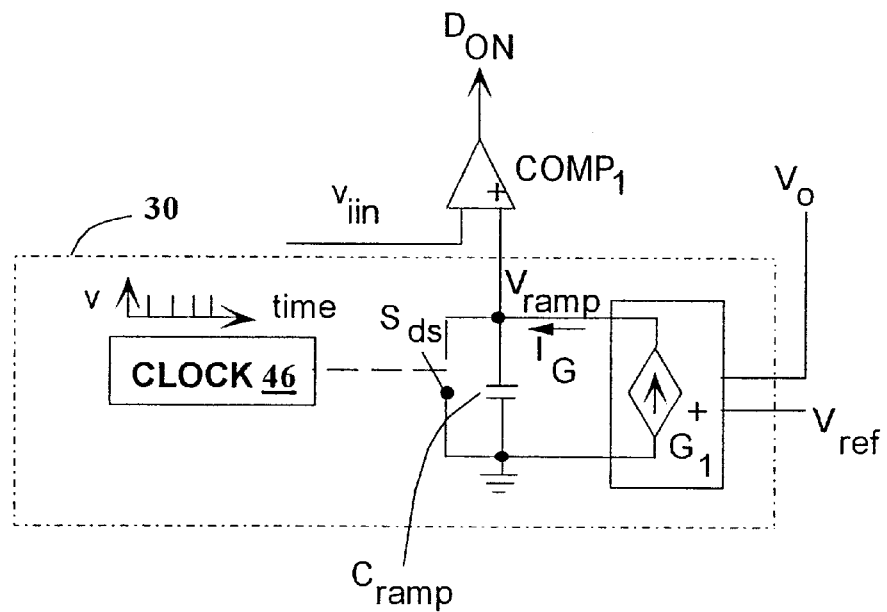
FIG. 4 shows the conceptual configuration of the boost converter control circuit according to the present invention.

FIG. 4 illustrates conceptually the basic configuration of the control circuit according to the present invention. The control circuit is based on a ramp signal generator made of a capacitor $C_{ramp}$, a dependent current source $G_1$, and a discharge switch $S_{ds}$. The present application uses the term "ramp signal" to denote an electrical signal whose magnitude, relative to some starting or baseline value, is proportional to the time which has elapsed from some starting time, and uses the term "ramp signal generator" to denote a device or circuit which outputs a ramp signal. Electrical signals usable as ramp signals include, but are not limited to, analog voltage signals and analog current signals. The output of a ramp signal generator must be periodically returned to a given value to keep the ramp signal within reasonable limits. Such as return to a given value is referred to as a "reset," and the present application uses the term "ramp signal period" to denote the period between resets of the ramp signal generator. A ramp signal is characterized by a slope, which measures the change in the ramp signal per unit time. The present application uses the term "dependent ramp signal generator" to denote a ramp signal generator which may be controlled in some manner according to an external electrical signal, such that the ramp signal thereof changes in some manner, such as by an alteration in the slope of the ramp signal or the ramp signal period. A ramp signal generator may be used in conjunction with a "threshold detector," which detects that the ramp signal has reached a predetermined value. Threshold detectors are commonly implemented with comparators. The control circuit according to the present invention uses a threshold detector with a ramp signal generator to precisely determine time periods. A threshold detector compares the ramp signal to a specified threshold, which may be determined according to an external electrical signal. The control circuit according to the present invention is illustrated conceptually in FIG. 4, and utilizes a ramp signal generator 30 with a voltage output having a zero volt starting value. The ramp signal output from ramp signal generator 30 is compared to the threshold by a threshold detector $COMP_1$ to determine the precise time periods for the duty switch of the boost converter to be in the different states of the duty cycle. In an embodiment, the duty switch is put in the opened state at the beginning of the ramp signal period, and when the ramp signal reaches the threshold, the duty switch is put in the closed state for the duration of the ramp signal period. By making the threshold dependent on the input current and the slope of the ramp signal dependent on the output voltage, the desired control of the boost converter duty cycle is achieved.

The present application uses the term "dependent current source" to denote a current source which outputs a current whose magnitude may be controlled according to an external electrical signal. In this case, the current output from dependent current source $G_1$ is proportional to the deviation of the output voltage $V_O$ from some reference voltage $V_{ref}$, which is the desired output voltage. That is, $I_G (V_O - V_{ref})$. The instantaneous voltage $V_{ramp}$ across capacitor $C_{ramp}$ is proportional to the time integral of the current $I_G$ driven through capacitor $C_{ramp}$ by dependent current source $G_1$:

$$V_{ramp}(t) = \frac{1}{C_{ramp}} \int I_G dt \qquad (11)$$

so that if $I_G$ is a constant value, the voltage across capacitor $C_{ramp}$ will be proportional to time. That is, the voltage across capacitor $C_{ramp}$ will be a ramp whose slope is proportional to $I_G$:

$$V_{ramp}(t) = \frac{t}{C_{ramp}} I_G \qquad (12)$$

The starting time t=0 in Equation (12) is determined by the opening of discharge switch $S_{ds}$. The control circuit also includes a comparator $COMP_1$ which is used as a pulse width modulator. The output of comparator $COMP_1$ is fed to the control terminal of duty switch $S_1$ of the boost converter (FIG. 1). The starting point of the voltage ramp over the period of a switching cycle $(T_S)$ is controlled by a clock 46 which produces sharp pulses that are used to discharge capacitor $C_{ramp}$ by closing discharge switch $S_{ds}$. The present application uses the term "clock" to denote any device or circuit which emits regular signals which are evenly separated in time. As indicated in Equation (12), the slope (SLOPE) of the voltage ramp is governed by the output current $I_G$ of dependent current source $G_1$. Hence the slope (SLOPE) will be:

$$SLOPE = \frac{I_G}{C_{ramp}} \qquad (13)$$

As shown in FIG. 3, current sensor 28 outputs a voltage proportional to the input current of the boost converter $(v_{iin} = K_{in} i_{ina})$. This voltage is compared to the ramp voltage at the input of comparator $COMP_1$ (FIG. 4) to get $T_{OFF}$ such that:

$$T_{OFF} \, SLOPE = v_{iin} \qquad (14)$$

Consequently:

$$T_{OFF} = \frac{v_{iin}}{SLOPE} \qquad (15)$$

Or:

$$T_{OFF} = K i_{ina} \qquad (16)$$

where:

$$K = \frac{K_i C_{ramp}}{I_G} \qquad (17)$$

Figure 5:
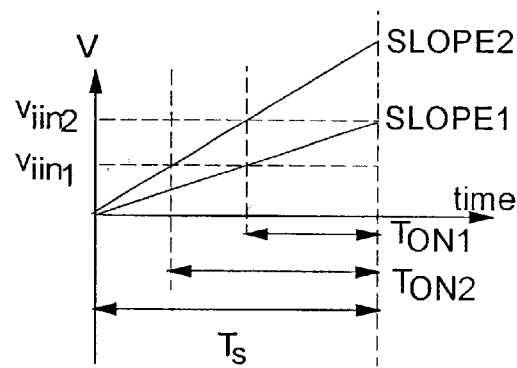
FIG. 5 shows the control circuit ramp voltage during a transient increase in load resistance.

It is thus evident that the basic circuit of FIG. 4 implements the control rule of Equation (7) and thus causes the input terminals of the boost converter (FIG. 1) to look resistive. Furthermore, the implementation as shown in FIG. 4 will also automatically maintain a constant output voltage as needed in many applications. This is accomplished by making dependent current source $G_1$ (FIG. 4) a function of the difference between a reference voltage $V_{ref}$ and the output voltage $V_O$. Consequently, if there is a change in output voltage $V_O$, for example a decrease in $V_O$ due to an increase in load current, the magnitude $I_G$ will increase in such a way as to make K smaller and hence $i_{in}$ larger. This is accomplished as follows:

FIG. 5 shows ramps corresponding to a case in which the steady state conditions change. The initial input current $i_{ina}$ through inductor $L_{in}$ (FIG. 1) is denoted as $i_{iin1}$, and is translated by current sensor 28 (FIG. 3) into a voltage $V_{iin1}$. A ramp signal SLOPE1 (FIG. 5) represents a ramp signal up to a maximum voltage $V_{iin1}$. The modified input current $i_{ina}$ through inductor $L_{in}$ (FIG. 1) is denoted as $i_{ina2}$, and is translated by current sensor 28 (FIG. 3) into a voltage $V_{iin2}$. A ramp signal SLOPE2 (FIG. 5) represents a ramp signal up to a maximum voltage $V_{iin2}$. The time t=0 is the start for ramp signal SLOPE2 and ramp signal SLOPE1, and after a period of $T_S$, the duty cycle ends. The initial steady state duty cycle ratio was $D_{ON1}$. In the case illustrated in FIG. 5, a modification results from an increase in load current which in turn results in a lower $V_O$. Dependent current source $G_1$ (FIG. 4) reacts to this change and its output current $I_G$ increases. This causes the slope of the voltage across capacitor $C_{ramp}$ (FIG. 4) to increase from an initial value of SLOPE1 to a steeper value SLOPE2 (FIG. 5). As a result the duty cycle closed time period will change from the initial value of $T_{ON1}$ to a new larger value $T_{ON2}$. As is known in the art, this change from $T_{ON1}$ to $T_{ON2}$ will increase the input current. Eventually, the system will settle at a new operating point with a higher input current (corresponding to $v_{iin2}$) in response to the higher power demand but with the same duty cycle closed period ($T_{ON1}$), at the intersection of ramp signal SLOPE2 with $V_{iin2}$.

Figure 6:
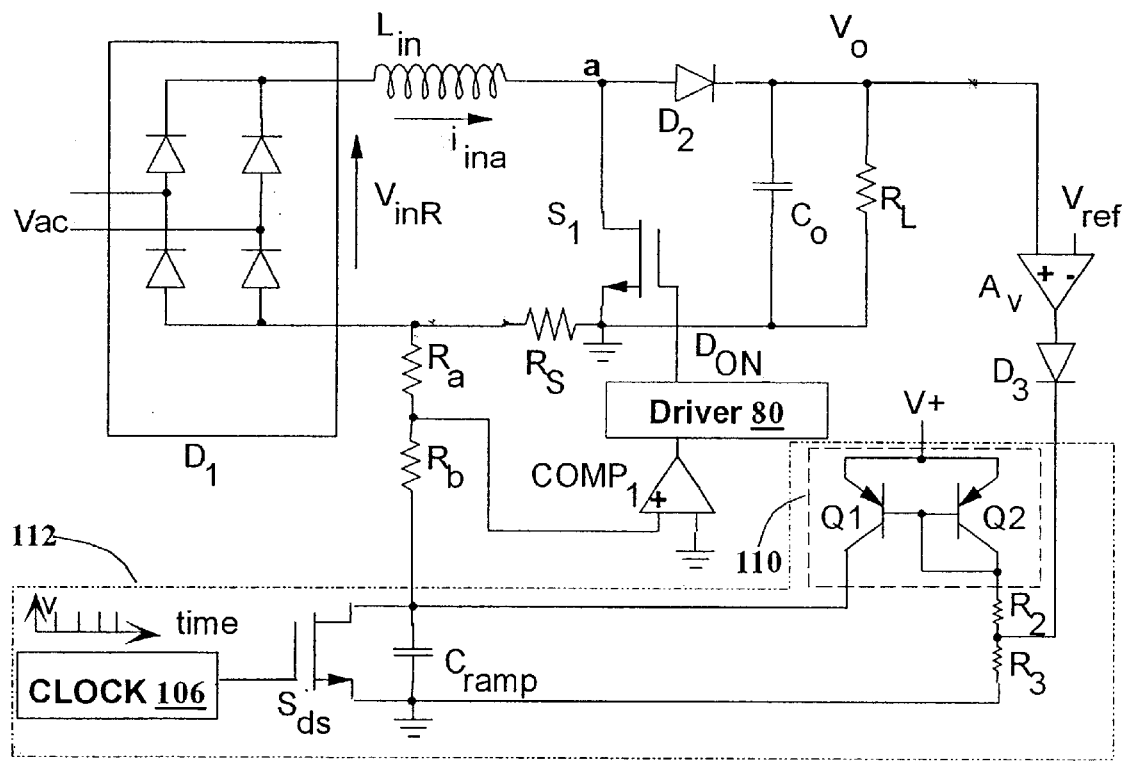
FIG. 6 shows an embodiment of the control circuit according to the present invention.

An embodiment of the control circuit according to the present invention is shown in FIG. 6. Here the current ijna through inductor Lin is sensed by a resistor $R_s$ and compared to a voltage ramp output from a ramp signal generator 112. Ramp signal generator 112 generates a voltage ramp across a capacitor $C_{ramp}$. The Slope of the voltage ramp is controlled by a current mirror 110 composed of a transistor Q1 and a transistor Q2. Current mirror 110 is driven by the output of a voltage error amplifier $A_v$. The inputs into voltage error amplifier $A_v$ are a reference voltage $V_{ref}$ and the output voltage $V_O$ (directly or after division). A voltage divider composed of a resistor $R_2$ and a resistor $R_3$ provides the input to the current mirror, and this input is proportional to the output voltage $V_O$. Transistor Q1 is forced to conduct the same current as transistor Q2 by this arrangement, and thus a current proportional to $V_O-V_{ref}$ charges capacitor $C_{ramp}$. In this way, current mirror 110 implements a dependent current source which charges capacitor $C_{ramp}$ to create a ramp voltage that is proportional to time. The period of the voltage ramp, and hence the PWM converter duty cycle is fixed by a clock 106 which outputs regular pulses to activate a discharge switch $S_{ds}$, which restarts the voltage ramp by discharging capacitor $C_{ramp}$. The present application uses the term "discharge switch" to denote any device which can be controlled to discharge a charge storage device. The present application uses the term "charge storage device" to denote any device which stores electrical charge, including, but not limited to capacitors and batteries. The output of ramp signal generator 112 goes into a voltage divider network composed of a resistor $R_a$ and a resistor $R_b$. The output from this voltage divider network is input into a comparator $COMP_1$, whose output is buffered by a driver 80 to operate a duty switch $S_1$. Duty switch $S_1$ provides the pulse width modulation that shapes the current waveform to achieve the desired results.

While the invention has been described with respect to a limited number of embodiments, it will be appreciated that many variations, modifications and other applications of the invention may be made.

What is claimed is:

1. A method for controlling the duty cycle of a duty switch within a boost converter in order to regulate the input impedance of the boost converter, the boost converter having an output voltage and an input current, the method comprising the steps of:

(a) providing a ramp signal having a slope determined by the output voltage;

(b) putting the duty switch into a first state when said ramp signal is reset;

(c) providing a threshold determined by the input current;

(d) comparing said ramp signal to said threshold; and (e) putting the duty switch into a second state when said ramp signal reaches said threshold.

2. The method as in claim 1, wherein said ramp signal is an electrical signal selected from the group consisting of an analog voltage signal and an analog current signal.

3. The method as in claim 1, wherein said first state is an opened state and wherein said second state is a closed state.

4. The method as in claim 1, wherein said first state is a closed state and wherein said second state is an opened state.

5. A control circuit for controlling the duty cycle of a duty switch within a boost converter in order to regulate the input impedance of the boost converter, the duty switch assuming one of a plurality of states, the boost converter having an output voltage and an input current, the control circuit comprising:

(a) a dependent ramp signal generator for generating a ramp signal, wherein the slope of said ramp signal is controlled by the output voltage;

(b) a mechanism for sensing the input current and outputting a threshold signal which is a function of the input current;

(c) a threshold detector for comparing said ramp signal to said threshold signal; and (d) a mechanism for controlling the state of the duty switch according to said comparing.

6. The control circuit as in claim 5, wherein said dependent ramp signal generator includes:

i) a dependent current source, having an output current that is controlled by an external electrical signal;

ii) a charge storage device;

iii) a clock; and iv) a discharge switch.

7. The control circuit as in claim 6, wherein said dependent current source includes a current mirror.

8. The control circuit as in claim 6, wherein said charge storage device includes at least one capacitor.

9. The control circuit as in claim 5, wherein said mechanism for sensing the input current includes at least one resistor.

10. The control circuit as in claim 5, wherein said threshold detector includes at least one comparator.

* * * * *

UNITED STATES PATENT AND TRADEMARK OFFICE
CERTIFICATE OF CORRECTION

PATENT NO.    : 6,307,361 B1
DATED         : October 23, 2001
INVENTOR(S)   : Ben-Yaakov et al.

It is certified that error appears in the above-identified patent and that said Letters Patent is hereby corrected as shown below:

<u>Title page,</u>
Item [75], Inventor, the name of the first inventor should be hyphenated -- Ben-Yaakov -- and not "Ben Yaakov" as is shown.
Item [12], "Yaakov et al" should read -- Ben-Yaakov et al --

Related U.S. Application Data
[63] Continuation of application no. 08-982,987, Dec. 2, 1997, abandoned.

Signed and Sealed this

Eleventh Day of June, 2002

*Attest:*

*Attesting Officer*

JAMES E. ROGAN
*Director of the United States Patent and Trademark Office*